United States Patent
Tanrikulu et al.

(10) Patent No.: US 9,460,642 B2
(45) Date of Patent: Oct. 4, 2016

(54) DYE SUBLIMATION FABRIC SEPARATED ELEMENTS

(71) Applicant: Avery Dennison Corporation, Mentor, OH (US)

(72) Inventors: Osman N. Tanrikulu, Denver, NC (US); Joseph Daley, Rock Hill, SC (US)

(73) Assignee: AVERY DENNISON RETAIL INFORMATION SERVICES, LLC, Westborough, MA (US)

( * ) Notice: Subject to any disclaimer, the term of this patent is extended or adjusted under 35 U.S.C. 154(b) by 141 days.

(21) Appl. No.: 14/192,124

(22) Filed: Feb. 27, 2014

(65) Prior Publication Data

US 2015/0122410 A1   May 7, 2015

Related U.S. Application Data

(60) Provisional application No. 61/900,541, filed on Nov. 6, 2013.

(51) Int. Cl.
*B41M 1/30* (2006.01)
*B41M 3/12* (2006.01)
(Continued)

(52) U.S. Cl.
CPC .............. *G09F 3/0291* (2013.01); *B32B 7/06* (2013.01); *B32B 7/12* (2013.01); *B32B 27/12* (2013.01); *B32B 27/36* (2013.01); *B32B 33/00* (2013.01); *B41M 5/5272* (2013.01);
(Continued)

(58) Field of Classification Search
CPC .......... B41M 1/26; B41M 1/30; B41M 3/12; B41M 5/12; B41M 5/50–5/508; B41M 5/5272; B41M 2205/02; B41M 2205/10; B44C 1/17; B44C 1/1712; B44C 1/1716; B44C 1/172; B44C 1/1725; G09F 3/02; G09F 2003/0211; D06P 5/00; D06P 5/004; B65C 5/04
USPC ............ 503/227; 156/240; 428/32.52, 32.79, 428/32.81
See application file for complete search history.

(56) References Cited

U.S. PATENT DOCUMENTS 5,268,348 A * 12/1993 Egashira .................. B41M 5/41 347/221
5,413,841 A   5/1995 Mahn, Sr. et al.
(Continued)

FOREIGN PATENT DOCUMENTS

EP    0128717    12/1984
EP    0351085    1/1990
(Continued)

OTHER PUBLICATIONS

International Preliminary Report on Patentability and Written Opinion dated May 10, 2016 for International Application No. PCT/US2014/018994 filed Feb. 27, 2014.
(Continued)

*Primary Examiner* — Bruce H Hess
(74) *Attorney, Agent, or Firm* — Avery Dennison Corporation Information Services, LLC

(57) ABSTRACT

A laminate that possesses dye sublimation properties, particularly for use as tagless labels and embellishments for garments, apparel, fabric items and so forth such as sportswear fabrics, clothing and accessories is provided. The laminate includes a dye sublimation ink layer that overlies a substrate in which the dye sublimation ink interacts with the substrate's chemical make-up.

6 Claims, 1 Drawing Sheet

(51) Int. Cl.

| | | |
|---|---|---|
| *B41M 5/52* | (2006.01) | |
| *B44C 1/17* | (2006.01) | |
| *G09F 3/02* | (2006.01) | |
| *D06P 5/00* | (2006.01) | |
| *B65C 5/04* | (2006.01) | |
| *G09F 3/00* | (2006.01) | |
| *G09F 3/10* | (2006.01) | |
| *B32B 27/36* | (2006.01) | |
| *B32B 33/00* | (2006.01) | |
| *D06P 5/28* | (2006.01) | |
| *B32B 7/06* | (2006.01) | |
| *B32B 7/12* | (2006.01) | |
| *B32B 27/12* | (2006.01) | |
| *B41M 5/025* | (2006.01) | |

(52) U.S. Cl.
CPC .............. *B44C 1/1712* (2013.01); *B65C 5/04* (2013.01); *D06P 5/004* (2013.01); *G09F 3/10* (2013.01); *B32B 2307/40* (2013.01); *B32B 2307/4026* (2013.01); *B32B 2307/748* (2013.01); *B32B 2437/00* (2013.01); *B32B 2519/00* (2013.01); *B41M 3/12* (2013.01); *B41M 5/0256* (2013.01); *G09F 2003/0201* (2013.01); *G09F 2003/025* (2013.01); *G09F 2003/0211* (2013.01); *G09F 2003/0222* (2013.01); *G09F 2003/0226* (2013.01); *G09F 2003/0255* (2013.01); *G09F 2003/0257* (2013.01); *G09F 2003/0282* (2013.01)

(56) References Cited

U.S. PATENT DOCUMENTS

| | | |
|---|---|---|
| 6,482,285 B2 | 11/2002 | Cross |
| 6,495,241 B2 | 12/2002 | Sato et al. |
| 6,846,538 B2 * | 1/2005 | Sato .................. C09J 7/0232 428/40.1 |
| 7,081,324 B1 | 7/2006 | Hare et al. |
| 8,546,279 B2 * | 10/2013 | Higashiguchi .......... D06H 1/04 442/149 |
| 9,205,693 B2 * | 12/2015 | Higashiguchi .......... D06P 5/004 |
| 2005/0199152 A1 | 9/2005 | Hale et al. |
| 2009/0025123 A1 | 1/2009 | Weedlum et al. |
| 2009/0075075 A1 | 3/2009 | Abrams |
| 2009/0280290 A1 | 11/2009 | Weedlum |
| 2010/0238252 A1 | 9/2010 | Dinescu et al. |

FOREIGN PATENT DOCUMENTS

| | | |
|---|---|---|
| EP | 0912792 | 5/1999 |
| EP | 1626114 | 2/2006 |
| GB | 2084931 | 4/1982 |
| WO | 9200852 | 1/1992 |
| WO | 2004050262 | 6/2004 |
| WO | 2009020893 | 2/2009 |

OTHER PUBLICATIONS

International Search Report dated Jul. 8, 2014 for international Application No. PCT/US2014/018994 filed Feb. 27, 2014.
Sawgrass Technologies Consumer "Sublimation 101 [2011 Edition] The Complete Guide to Successful Dye Sublimation Printing" written by Peter Swain, with contributions from Jimmy Lamb, Sawgrass Technologies Consumer.

* cited by examiner

DYE SUBLIMATION FABRIC SEPARATED ELEMENTS

CROSS-REFERENCE TO RELATED APPLICATION

The present application claims the benefit of U.S. Provisional Application No. 61/900,541 filed Nov. 6, 2013 which is incorporated herein by reference in its entirety.

FIELD OF THE DISCLOSURE

The present subject matter relates to tagless labels and laminates that have dye sublimation images and fabric separated characteristics, particularly for use as tagless labels and embellishments for garments, apparel, fabric items and so forth such as sportswear fabrics, clothing and accessories. The present subject matter is especially suitable for labels that capture color strengths of digitally printed dye sublimation images and enjoy the look and application methodology of heat transfer tagless labels.

DESCRIPTION OF RELATED ART

Tagless labels are applied directly to the item to be labeled or embellished though a process that avoids attachment methods such as stitching or tacking and instead applies the label to the fabric or other substrate from a roll or cut single transfer in the presence of heat and pressure. Such tagless labels can be seen by the user without having the user experience the additional bulk typically associated with a separate tag that is affixed to the surface of the substrate that is being labeled or embellished while remaining as a separate piece. Instead, a tagless label is printed, hot-melt adhered or otherwise applied directly to the substrate such as a garment to eliminate or substantially reduce the feel of a separate tag that sewn or otherwise attached to the substrate.

The tagless labels can include indicia and can be in the form of decoration, labels, patches, identification placards, embellishments and the like that are widely used for a variety of different applications including product identification, product features, materials, sizes, styles, and so forth. Some can take the form of or include logos, trademarks, keyboard symbols, whether numeric, alphabetic or alphanumeric or other symbols, sports designs, logos and names, clothing design details, accents and backgrounds, artwork and the like. Typically, these indicia are included on assemblies in the nature of heat transfer labels suitable for application on "soft goods" items such as fabrics, clothing and accessories, including specific products such as upper body wear, lower body wear, headwear, footwear, outerwear, underwear, garments, sportswear fabrics, other sheet goods, banners, flags, athletic or sport clothing and uniforms, government uniforms, organization uniforms, and combinations thereof.

Dye sublimation printing of textiles is discussed, for example, in U.S. Patent Application Publication No. 2009/075075 in which printed images simulate stitching providing a faux embroidery textile, using digital images to control dye sublimation printing in creating this effect. U.S. Patent Application Publication No. 2009/025123 digitally prints appliqué emblems by applying digitally printed appliqué indicia, as an alternative to direct embroidery U.S. Pat. No. 7,081,324 concerns dye sublimation thermal transfer sheets used for applying to a receptor fabric, while providing a medium by which heat activated sublimation dyes can penetrate and adhere to a surface not inherently capable of supporting dye sublimation inks, such as cotton. U.S. Patent Application Publication No. 2005/199152 describes using sublimation or similar heat activated dyes which are activated and applied to a substrate, printing both a reactive ink and a heat activated dye on a substrate. Each of the publications identified herein is incorporated by reference hereinto, especially for their information regarding dye sublimation image formation and printing and for specifics of chemicals and materials suitable for use in dye sublimation digital printing.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In one aspect of this disclosure, a digitally printed, dye sublimation ink laminate is provided which includes a dye sublimation ink layer overlying a polyester or base substrate layer. The dye from the ink layer sublimates into a material layer such as a polyester interacting with the molecules of the polyester layer. An adhesive layer is adhered to the back face of the substrate or material layer. An optional layer may be releasably secured to the surface of the adhesive layer that is not adhered to the material layer.

In another aspect of this disclosure, a digitally printed, dye sublimated printed laminate is provided in which the laminate includes a sublimation ink layer on the front face of a substrate layer, an adhesive layer on the back face of the substrate layer, and a release layer releasably secured to the adhesive layer. A carrier overlies the sublimation ink layer forming a multi-layered lamination. In use, the release layer is separated from the adhesive layer of the multi-layered lamination, and the resulting separated elements lamination is affixed to an item such as a consumer good, particularly a garment of clothing. The carrier is separated from the image layer of the fabric separated elements lamination to provide the label with a dye sublimation digitally printed label.

In an additional aspect, the disclosure relates to a method of providing a digitally printed, dye sublimation ink laminate which includes an adhesive layer having a first surface and a second surface, an optional release layer that is releasably secured to the first surface of the adhesive layer, a substrate overlying the second surface of the adhesive layer, a digitally printed, dye sublimation ink layer having one surface overlying the substrate, a pressure sensitive adhesive film carrier overlying the other surface of the printed layer forming a multi-layered lamination. The sublimation ink of the dye sublimation ink layer may form an image and/or indicia. The method further includes separating the release layer from the adhesive of the multi-layered lamination and forming a fabric separated elements lamination, then positioning the fabric separated elements lamination over a soft goods item, e.g. garment, apparel, and applying a heat and pressure regimen onto the pressure sensitive adhesive carrier, thereby affixing the lamination to the soft goods item. The carrier is then removed from the digitally printed, dye sublimation layer after the lamination is affixed to provide a digitally printed, dye sublimation label on the soft goods item. Optionally, a second heat and pressure regimen is applied onto the dye sublimation ink printed layer subsequent to removal of the carrier.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
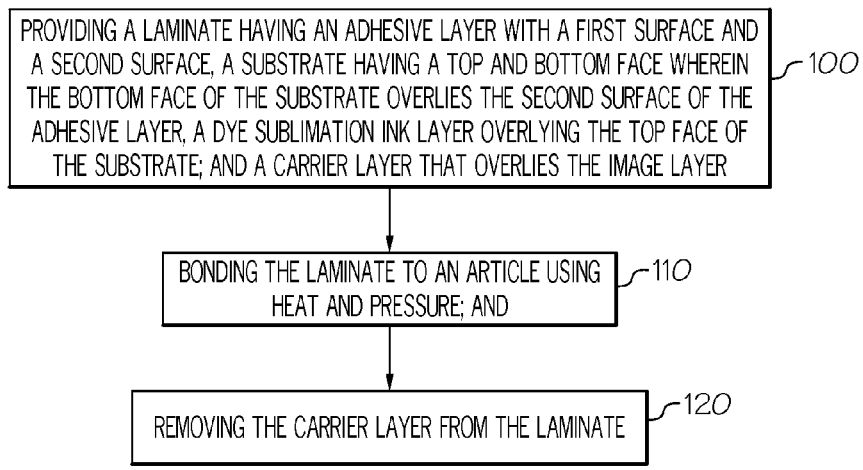
FIG. 1 is a flow chart illustration of the components of the dye sublimated digitally printed label and method of manufacture and method of use.

FIG. 1 provides a flow chart for an embodiment of the product and method of its production and use. First in step 100, a laminate (shown in FIG. 2) is provided in which the laminate 40 has an adhesive layer 42 with a first surface 50 and a second surface 51. A substrate 43 having a top 54 and bottom 53 face is also provided such that the bottom face 53 of the substrate 43 overlies the second surface 51 of the adhesive layer 42. The layers are generally substantially juxtaposed on one another but it should also be considered within the scope of this invention that the layers may be slightly splayed out of alignment or extend beyond an edge or side of one another.

In one embodiment, an optional release layer 41 may be provided such that the release layer is adhered to the first surface 50 of the adhesive layer 42. A dye sublimation ink layer 44 is provided over the top face 54 of the substrate 43, and a carrier layer 45 is provided over the ink layer 44 forming a multi-layered lamination. The sublimation ink of the dye sublimation ink layer 44 may be digitally printed as an image and/or indicia, or may be a solid layer provided over the substrate. Next, in step 110, the laminate is bonded to an article which can be a soft consumer good such as an article of clothing. Bonding includes the utilization of both heat and pressure. Lastly, in step 120, the carrier layer 45 is removed from the laminate 40. If a release layer 41 is utilized, it is removed from the laminate prior to bonding the laminate to the article.

In one embodiment, the laminate of the present invention is made ready for application as a tagless label to a garment, fabric, or other item by removal of the release layer, thereby exposing the adhesive layer. It is also contemplated that the laminate can be cut into different shapes and sizes for application purposes. For example, the laminate may be cut into a particular numeral or letter for a jersey or other garment in one embodiment. Alternatively, the laminate may take any shape such as a trademark or any other geometric configuration. It is important to note that the release layer is optional and is not required to be utilized. The laminate is bonded to the garment or other soft good typically with the use of a bonding machine that applies heat and pressure for a selected time period in step 110 of the method illustrated in FIG. 1. An example of a suitable bonding machine for use with the present method is Avery Dennison AD-718 which is a bonding machine that applies heat from the top surface only such that the heat penetrates down through the layers. In some applications, a second pass through the bonding machine, after the carrier layer is removed occurs.

Figure 2:
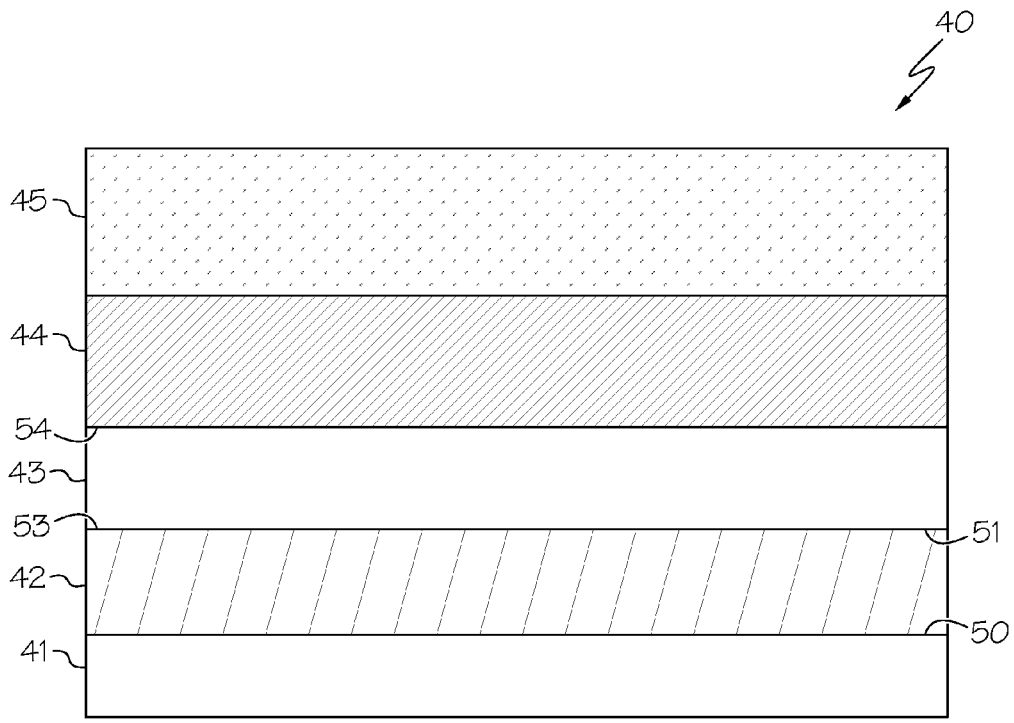
FIG. 2 is a plan view of a dye sublimated ink digitally printed label according to the present disclosure.

FIG. 2 illustrates the construction of a digitally printed, sublimation dye laminate according to the present invention. FIG. 2 shows the label generally depicted by reference numeral 40 having an adhesive layer 42 disposed between a first surface 50 and a second surface 51. An optional release layer 41 may be adhered to the first surface 50 of the adhesive layer 42. A substrate layer 43 having a top 54 and bottom face 53 is provided over the second surface 51 of the adhesive layer 42. A dye sublimation ink layer 44 is provided over the substrate layer 43, and an optional carrier layer 45 overlies the ink layer. The dye sublimation ink layer in one embodiment is digitally printed onto the substrate layer. The sublimation ink may form an image, character and/or indicia.

The digitally printed, dye sublimation ink layer sublimates into the substrate layer and interacts with the molecules of the substrate layer. By the ink of the image and/or indicia interacting with the substrate layer, the laminate of the present invention has increased durability which is an improvement over that which is already in the marketplace. The image or indicia made out of sublimation dye is printed in reverse on the substrate to allow for the image and/or indicia to be easily read when transferred. In one embodiment the substrate layer 43 is a coated paper layer. The substrate 43 may also be a material layer such as a polyester, a polyester blend, or poly-spandex. The substrate may also be either a film, or any other dye sub ink receptive ink fabric/polymer.

In one embodiment, the substrate layer may be a reflective fabric.

The adhesive layer 42 is generally a hot melt adhesive layer, such as a polyester type of hot melt adhesive. Various hot melt adhesive are known in the art. This adhesive layer 42 is to be suitable for tagless label delivery and adherence, typically being thinner than the thickness of the dye sublimation fabric layer, generally on the order of one-third the thickness. Illustrative of adhesive layer thicknesses in this regard are within a range between about 1 and about 7 mills (about 25 and about 178 microns), or between about 2 and about 5 mills (about 50 and about 127 microns), or between about 2 and about 4 mills (about 50 and about 100 microns).

With further reference to the adhesive layer 42 described in connection with the present embodiments, the adhesive 42 has a modulus suitable to withstand high temperature wash tests such as those required by some apparel manufacturers. The adhesive also has to have suitable adhesion to synthetic fibers during hot melt adhesion. Usually, the adhesive is continuously extruded or flood coated to a thickness as discussed herein. In many applications, the adhesive needs to melt and flow in the fabric texture at a temperature of between 250 and 350° F. (approximately 121 to 177° C.) when heated for 5 to 50 seconds. In some applications, the bonding temperature is between about 285 and 330° F. (approximately 140 to 165° C.).

The present invention contemplates that in one embodiment the dye sublimation ink layer 44 may have a portion of said layer which does not exhibit sublimation dye properties such that the sublimation dye does not interact with the substrate.

In order to facilitate protection and delivery of the label, a support portion such as a release layer can be provided which provides mechanical strength to the label assembly allowing handling such as being wound up in a roll for storage, stacking, and as a label feed for mechanized operations. Basically, the support portion comprises both the sheet carrier and release layer. Typical carriers are cellulosic or polymeric film. A typical release layer is a low melting temperature, thinly coated film on a sheet carrier that facilitates peeling of the transfer portion from the sheet carrier when the heat transfer is completed. Another example of a release layer that could be utilized is a silicon coated paper release layer.

The carrier layer 45 may be a pressure sensitive adhesive film in one embodiment. The combined thickness of the dye sublimation ink layer 44 and carrier layer 45 may be between approximately 2.5 and 3.5 times the combined thickness of the release layer and the adhesive layer. The present invention also contemplates that in one embodiment the carrier layer may be heat resistant.

In one embodiment of the present invention, a particular image, such as a number or letter, can be completely cut out of the laminate 40. The cutting can be accomplished by a laser, mechanical die cut, or plotter cutter and can be done prior to separation of the release layer and the carrier from the multi-layered laminate construction.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A dye sublimation ink laminate, comprising:
   a hot melt adhesive layer having a first surface and a second surface;
   a release layer that is releasably secured to the first surface of the hot melt adhesive layer;
   a polyester layer having a top and bottom face wherein the bottom face is adhered to the second surface of the hot melt adhesive layer;
   a digitally printed, dye sublimation ink layer having one surface overlying the top face of the polyester layer wherein the ink layer sublimates into the polyester layer;
   a pressure sensitive adhesive film carrier overlying the dye sublimation digitally printed, dye sublimation ink layer forming a multi-layered assembly lamination; and
   wherein the release layer separates from the hot melt adhesive of the multi-layered lamination, and the pressure sensitive adhesive film carrier separates from the digitally printed, dye sublimation layer of the multi-layered lamination to provide the dye sublimation digitally printed laminate.

2. The laminate of 1, wherein the combined thickness of the dye sublimation ink layer and carrier are between approximately 2.5 and 3.5 times the combined thickness of the release layer and the adhesive.

3. The laminate of claim 1, wherein the carrier is heat resistant.

4. The laminate of 1, wherein the dye sublimation ink layer includes an image and/or indicia.

5. The laminate of claim 1, wherein the thickness of said dye sublimation ink layer is between about 7 and about 10 mils, and the thickness of the adhesive layer is between about 2 and about 5 mils.

6. The laminate of claim 1, wherein the multi-layered lamination is formed by cutting into a desired shape of the laminate prior to separation of the release layer and the pressure sensitive adhesive film carrier from the multi-layered laminate.

* * * * *